(12) United States Patent
Ramachandran et al.

(10) Patent No.: US 9,386,461 B2
(45) Date of Patent: Jul. 5, 2016

(54) LOCATION AWARE SELF-LOCATING ACCESS POINT

(71) Applicant: QUALCOMM Incorporated, San Diego, CA (US)

(72) Inventors: Ponmudi Ramachandran, Chennai (IN); Subramanian Anantharaman, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 13/923,882

(22) Filed: Jun. 21, 2013

(65) Prior Publication Data

US 2014/0376529 A1 Dec. 25, 2014

(51) Int. Cl.
*H04W 16/18* (2009.01)
*H04W 24/02* (2009.01)
*H04W 88/08* (2009.01)

(52) U.S. Cl.
CPC .............. *H04W 16/18* (2013.01); *H04W 24/02* (2013.01); *H04W 88/08* (2013.01)

(58) Field of Classification Search
CPC .................................................... H04W 16/18
See application file for complete search history.

(56) References Cited

U.S. PATENT DOCUMENTS

| 8,527,457 | B2 * | 9/2013 | Moon | H04L 67/125 707/603 |
|---|---|---|---|---|
| 2005/0124355 | A1 | 6/2005 | Cromer et al. | |
| 2007/0297357 | A1 * | 12/2007 | Todd | H04W 48/12 370/328 |
| 2009/0129354 | A1 | 5/2009 | Gupta et al. | |
| 2009/0310593 | A1 | 12/2009 | Sheynblat et al. | |
| 2010/0214956 | A1 * | 8/2010 | Law | H04L 12/14 370/255 |
| 2011/0028166 | A1 | 2/2011 | Ketchum et al. | |
| 2011/0176435 | A1 * | 7/2011 | Khandekar | H04L 5/16 370/252 |
| 2011/0199917 | A1 * | 8/2011 | Karaoguz | G01S 5/0284 370/252 |
| 2011/0280136 | A1 * | 11/2011 | Wang | H04B 7/2656 370/241 |
| 2012/0307645 | A1 * | 12/2012 | Grosman | H04B 7/2643 370/241 |
| 2013/0005347 | A1 | 1/2013 | Curticapean | |
| 2013/0021912 | A1 * | 1/2013 | Finlow-Bates | G01S 5/021 370/241 |
| 2014/0003270 | A1 * | 1/2014 | Maltsev | H04W 52/34 370/252 |
| 2014/0003273 | A1 * | 1/2014 | Dimou | H04W 24/02 370/252 |
| 2014/0056271 | A1 * | 2/2014 | Ahn | H04W 52/146 370/329 |

* cited by examiner

*Primary Examiner* — Hassan Kizou
*Assistant Examiner* — Abdullahi Ahmed
(74) *Attorney, Agent, or Firm* — DeLizio Law, PLLC

(57) ABSTRACT

A location aware, self-locating access point can provide a wireless link through a wireless network to a wireless device. If the wireless link bandwidth is less than a target bandwidth for the wireless device, then the location aware, self-locating access point can move itself to a new operating location that provides an increased wireless link bandwidth. If a second wireless device is added to the wireless network, then the new operating location is selected to provide an increased link bandwidth for both wireless devices. In one embodiment, the wireless devices in the wireless network can be prioritized so that the new operating location increases the wireless link bandwidth for the wireless device with a higher priority.

56 Claims, 6 Drawing Sheets

SELF-LOCATING ACCESS POINT

LOCATION AWARE SELF-LOCATING ACCESS POINT

BACKGROUND

This disclosure generally relates to the field of communication systems and, more particularly, to location aware, self-locating access points.

Access points can provide a communication bridge between wireless devices and broadband network resources such as Internet resources. An access point is typically connected to the broadband network resources with a cable and remains stationary once its location has been established to provide the broadest wireless coverage to the service area. Connection through the cable, however, can limit positioning of the access point. The limited positioning options and the stationary nature of the access point can result in a poor or limited wireless coverage of the service area. The poor or limited wireless coverage can result in a wireless link bandwidth between the wireless device and the access point that does not provide a sufficient data rate for some applications. For example, the wireless link bandwidth may not provide a sufficient data rate to stream a movie from the access point to the wireless device.

Wireless link bandwidth can be a function of the distance between the wireless device and the access point. Repositioning the access point closer to the location of the wireless device can increase the associated wireless link bandwidth; however, frequent repositioning to accommodate a moving wireless device may be tedious.

SUMMARY

Disclosed herein are various embodiments of a location aware, self-locating access point. In one embodiment, the location aware self-locating access point can determine wireless link bandwidth between a wireless device and the location aware self-locating access point while operating at a first operating location. The location aware self-locating access point can determine a second operating location when the wireless link bandwidth is less than a target bandwidth of the wireless device. The location aware self-locating access point can move to the second operating location.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
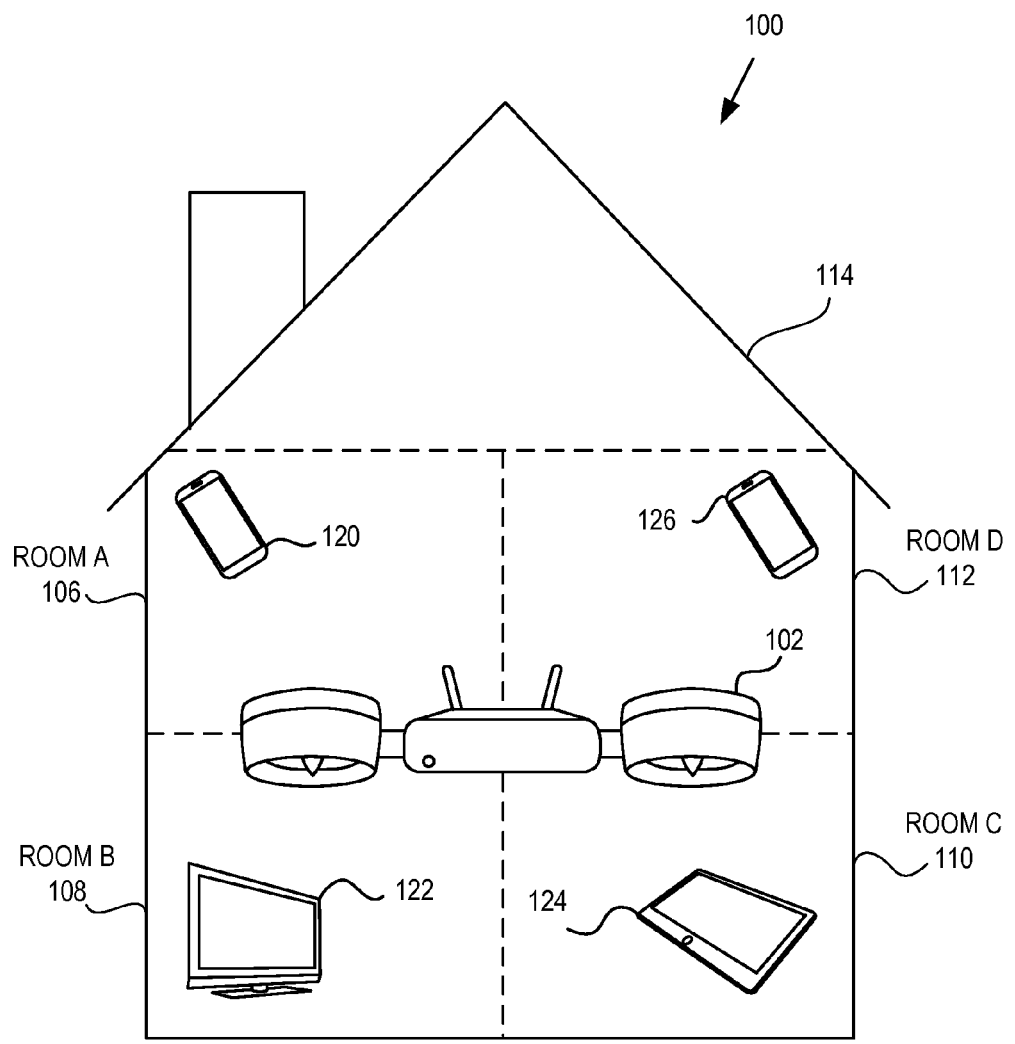
FIG. 1 is an example system diagram depicting a self-locating access point operating in a service area, according to some embodiments.

The description that follows includes exemplary systems, methods, techniques, instruction sequences and computer program products that embody techniques of the present inventive subject matter. However, it is understood that the described embodiments may be practiced without these specific details. For instance, although examples refer to networks operating in compliance with IEEE 802.11 standards, any other technically feasible wireless networks can be used such as networks following Zigbee® or BLUETOOTH® protocols. In other instances, well-known instruction, protocols, structures and techniques have not been shown in detail in order not to obfuscate the description.

An access point can provide communications between a wireless device and a remote (e.g., backhaul) network; at times, the wireless link bandwidth between the access point and the wireless device may not be sufficient to provide acceptable wireless device performance. Some wireless devices can be mobile devices such as laptops, tablet computers and smart phones and the like. Other wireless devices can be substantially less mobile, such as network-ready monitors and television receivers. Different wireless devices can use different amounts of data. Data usage can be described in terms of bandwidth, which is an amount of data per unit time. For example, a bandwidth of smart phone browsing webpages on the internet can sporadically consume 1 Megabyte/second (Mb/s) while, in contrast, a bandwidth of a tablet computer can consume 8 Mb/s for online video streaming. Moreover, different applications can consume different amounts of data, when running on the same wireless device. For example, a bandwidth of a video stream can consume 8 Mb/s and browsing webpages can consume 2 Mb/s on a tablet computer (data rates can depend on content of the webpages and well as video content characteristics).

The access point, connected through a cable to the network, can be positioned centrally to provide wireless coverage to the largest amount of service area. The cable, however, can limit the positioning of the access point so that some portions of the service area can have poor or limited wireless coverage.

A throughput data rate of a wireless connection between the access point and the wireless device can vary as a function of distance between the two devices. In other words, the signal strength of the wireless signal can progressively weaken at the receiving end as the distance between the access point and the wireless device increases. As a result, the throughput (i.e., throughput data rate) can suffer. In addition, the greater the distance between the access point and the wireless device, the greater the opportunity for signal interferers and signal blockers to affect the wireless signals undesirably.

Insufficient data throughput may occur between the access point and the wireless device due to various factors. For example, a wireless device may switch from running one application that needs lower bandwidth to another application that requires higher bandwidth; a mobile device may have moved further away from the access point causing signal strength to weaken; or additional wireless devices may join the access point and require additional bandwidth.

Insufficient data throughput between the wireless device and the access point may cause poor performance of the wireless device by starving the wireless device of data required for executing an application. For example, a tablet computer trying to stream video may require 8 Mb/s of bandwidth, but because of relative locations of the tablet computer and the access point, the available bandwidth may only be 4 Mb/s. The limited available bandwidth may cause the tablet computer to display the video stream with errors such as dropped or replicated video frames.

In some embodiments, a self-locating access point can monitor the wireless link bandwidth between the access point at its current location and the wireless device. As used herein, the terms "bandwidth" and "wireless link bandwidth" are intended to be interchangeable and refer to a data transfer rate between two devices. Each wireless device in the network can be characterized with a target (desired) bandwidth and a priority number. In one implementation, a user can determine the target bandwidth and the priority number. The target bandwidth can describe a wireless link bandwidth for a particular wireless device that provides acceptable performance. The priority number can describe a priority of a particular wireless device in relation to other wireless devices in the network. The use of priority numbers is described in more detail below in conjunction with FIGS. 2 and 3. If the wireless link bandwidth at a current operating location for a particular wireless device is less than the target bandwidth associated with the wireless device, then the self-locating access point can determine a new operating location and move itself to the new operating location.

In some embodiments, the operation of the self-locating access point can be limited to particular pathways and locations. For example, the pathways and operating locations may be determined by manually positioning the self-locating access point through possible operating locations and capturing location information, such as global positioning system (GPS) location information. In this way, the self-locating access point can "record" possible operating locations. The location information may be stored in a memory in the self-locating access point. In another implementation, the location information may be stored in a memory remote from the access point, accessible through a network connection. Location information can also be determined from other location satellite systems such as the Russian Global Navigational Satellite System (Glonass) and European Union Galileo Navigational System. In yet another implementation, location information can be determined from Wi-Fi® based location information. In another embodiment, the self-locating access point can roam over a bounded operating area. Location information can be used to bound the operating area. For example, the location information can be used to form a fence around the operating area.

The self-locating access point can include one or more components operable to move the self-locating access point to new operating locations. For example, the self-locating access point can include one or more fans that enable the access point to hover controllably within a service area. In another example, the self-locating access point can include a combination of directional fans and lifting agents such as gas-filled balloons. In yet another example, a plurality of drive motors can provide motion to the self-locating access point.

The self-locating access point can be powered by one or more batteries. The batteries can be charged with solar cells, non-contact inductive chargers, a charging dock or any other technically feasible charging technology. In one implementation, the batteries may be replaceable.

The self-locating access point can include two wireless interfaces. A first wireless interface can provide local wireless network service to communicate with wireless devices such as interfaces that conform to ZigBee protocol, IEEE 802.11 standards or the like. A second wireless interface can provide a wireless link to network or broadband resources, such as a broadband network. The second wireless interface can include cellular radios, such as those that can conform to 3$^{rd}$ Generation Partnership Project (3GPP), 3G/4G Long Term Evolution (LTE), CDMA2000 or other similar standards.

FIG. 1 is an example system diagram 100 depicting a self-locating access point 102 operating in a service area 114, according to some embodiments. The self-locating access point 102 (hereinafter self-locating AP 102) can compare a wireless link bandwidth of a wireless device to a target bandwidth of the wireless device. When the wireless link bandwidth is less than the target bandwidth, then the self-locating AP 102 can move to a new operating location that can reduce distance between the self-locating AP 102 and the wireless device and thereby increase the wireless link bandwidth.

The self-locating AP 102 provides wireless service to the service area 114. In system diagram 100, the service area 114 is shown as a house; however, the service area 114 can take the form of any area or volume that is serviced by the self-locating AP 102, such as an apartment, a multiple-floor dwelling or a larger area such as a farm or a ranch or office building.

In some embodiments, the service area 114 can be divided into regions. Often, the regions can coincide with existing natural divisions. For example, if the service area 114 is a house, then the service area 114 can be divided into regions as shown; room A 106, room B 108, room C 110 and room D 112. Different wireless devices can be found within different regions. In this example, smart phone 120 can be located in room A 106, network enabled TV 122 can be in room B 108, tablet computer 124 can be in room C 110 and a second smart phone 126 can be in room D 112.

Each wireless device can be associated with a particular target bandwidth selected to provide smooth operation and acceptable wireless device performance. For example, smart phone 120 and second smart phone 126 can be associated with a target bandwidth of 1 Mb/s; tablet computer 124 can be associated with a target bandwidth of 8 Mb/s; and network enabled TV 122 can be associated with a target bandwidth of 80 Mb/s. In one embodiment, a device profile table can be assembled and can include a wireless device identity, a target bandwidth for the wireless device and a priority number. The priority number can indicate which wireless devices have priority over other wireless devices with respect to maintaining the target bandwidth of the wireless device. The use of priority numbers is described in more detail in conjunction with FIG. 2 below. In one embodiment, the device profile table can be stored in a memory included in the self-locating AP 102.

The self-locating AP 102 can determine the wireless link bandwidth between the self-locating AP 102 and each of the wireless devices communicably coupled to the self-locating AP 102. For example, the self-locating AP 102 can correlate receive signal strength indicator (RSSI) values associated with a particular wireless device to determine, at least in part, the wireless link bandwidth of that wireless device. In another example, the self-locating AP 102 can measure the actual wireless link bandwidth provided to the particular wireless device. In yet another example, the self-locating AP 102 can determine which modulation and coding schemes (MCS) is used by a particular wireless device to determine the wireless link bandwidth. Persons skilled in the art will appreciate that the MCS describes a modulation scheme used to transmit and receive wireless data and that each modulation scheme can be associated with a bandwidth.

When the self-locating AP 102 determines that the wireless link bandwidth is less than the target bandwidth for a wireless device, then the self-locating AP 102 determines if a new operating location of the self-locating AP 102 can improve the wireless link bandwidth for the wireless device. In one embodiment, a set of possible operating locations of the self-locating AP 102 can be defined by a user. For example, the user can manually position (move) the self-locating AP 102 along desired operating pathways while the self-locating AP 102 collects and stores location information. The collected location information can be compiled into one or more pathways to provide possible operating locations for the self-locating AP 102 to follow during operation. In this manner, the self-locating AP 102 can learn possible operating locations in a "record and play" manner. In one implementation, the possible operating locations of self-locating AP 102 can be constrained to within a tolerance distance of the operating pathway. For example, the self-locating AP 102 may be constrained to operating locations with five centimeters of the operating pathway.

In another embodiment, operating locations of the self-locating AP 102 may not be restricted to operating pathways, but may be limited to an operating area. Location information can define boundaries that bound the operating area. In one implementation, the user can manually position the self-locating AP 102 along a boundary perimeter while collecting location (e.g., GPS, Glonass, Wi-Fi location) data. In another example, the user can provide (download) boundary perimeter information to the self-locating AP 102 that was determined through a separate application running on a separate computer. The boundary perimeter can provide a "fence" that limits the self-locating AP 102 motion.

If the self-locating AP 102 determines that a new operating location can improve the wireless link bandwidth of a wireless device, then the self-locating AP 102 can autonomously move (reposition) itself to the new operating location. The self-locating AP 102 can move without any other direction or instruction, particularly from other network devices. For example, self-locating AP 102 can move by hovering through fans or using a combination of fans and helium filled balloons or the self-locating AP 102 can include wheels and motors to roll the self-locating AP 102 throughout the service area 114. In another embodiment, The self-locating AP 102 can limit its operating locations to the determined operating pathways as described above. The self-locating AP 102 can use any technically feasible components to move itself to the new location.

To assist in determining the new operating location, the self-locating AP 102 can determine the locations of the wireless devices within the service area 114. In one embodiment, location information can be determined by inspecting wireless communications made in accordance with IEEE 802.11v standards. In another embodiment, the self-locating AP 102 can obtain GPS location information from the wireless devices particularly when the wireless devices include GPS capability, such as is commonplace in smart phones 120 and 126. In yet another embodiment, communication signal round trip times from self-locating AP 102 to the wireless device can determine distances between the wireless device and the self-locating AP 102. In still another embodiment, other Wi-Fi based locationing concepts can determine wireless device location.

Figure 2:
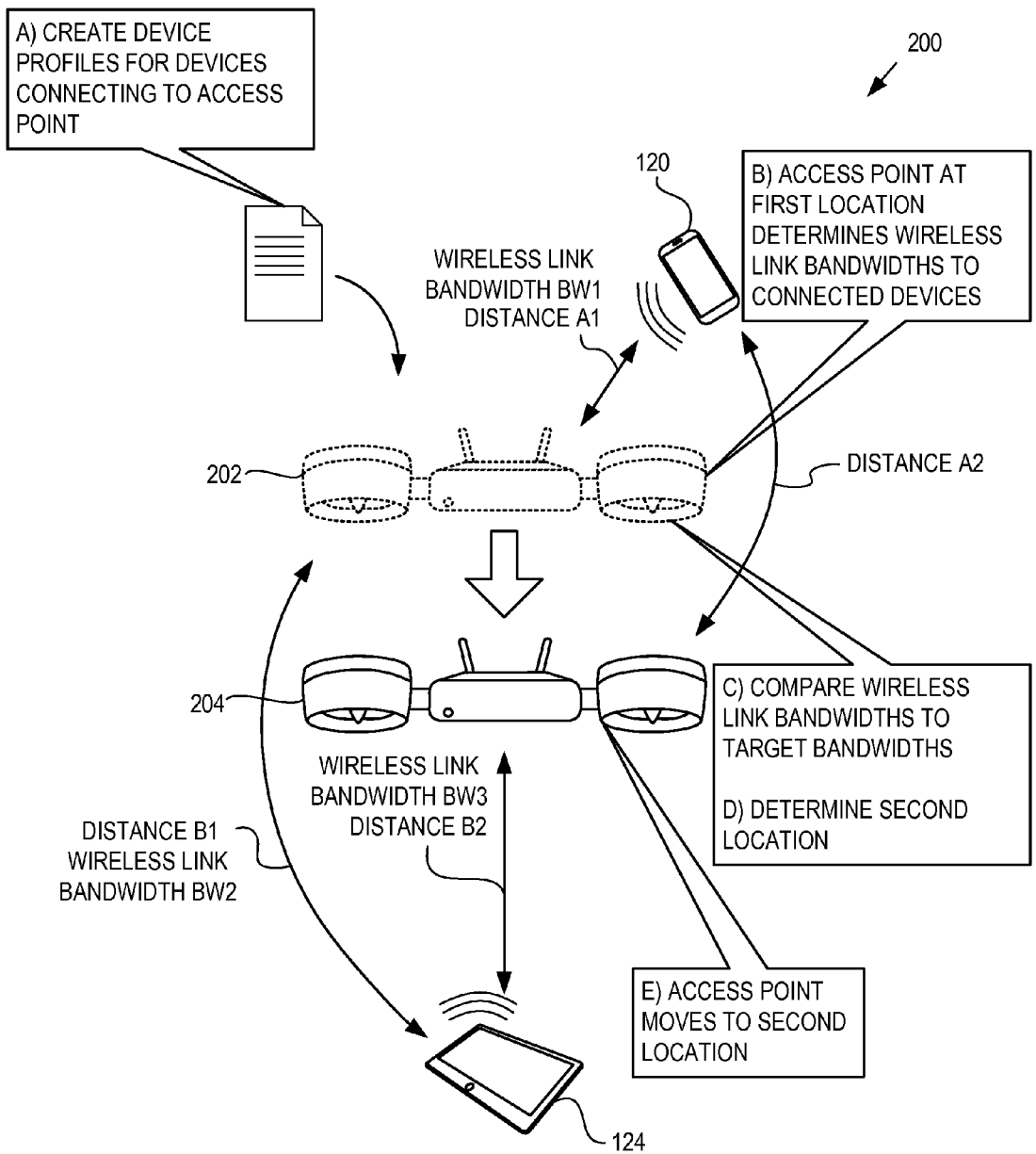
FIG. 2 shows a block diagram of an example wireless communication system, according to some embodiments

FIG. 2 shows a block diagram 200 of an example wireless communication system, according to some embodiments. Operation of the self-locating AP 102 is depicted in FIG. 2. self-locating AP 102 can provide wireless connectivity between wireless devices (shown here as smart phone 120 and tablet computer 124) and a wireless network, such as a broadband wireless network. In this example, the self-locating AP 102 includes two wireless interfaces. A first wireless interface is used to provide uplink (backhaul) services from self-locating AP 102 to a broadband network (not shown). For example, the first wireless interface can be a cellular phone based interface and can use cellular radio technology such as technology following 3GPP 3G/4G LTE, CDMA2000 standards etc. to provide broadband network access. A second wireless interface can connectively couple the self-locating AP 102 to the wireless devices, in this example tablet computer 124 and smart phone 120. The second wireless interface can follow the ZigBee protocol, IEEE 802.11 standards or any other technically feasible wireless communication protocol.

At stage A, device profiles for the wireless devices coupled to self-locating AP 102 are created, and in one embodiment, stored in a device profile table. In one implementation, the stored device profiles can include profiles for wireless devices previously (but not currently) coupled to the self-locating AP 102. Each wireless device can have a corresponding device profile in the device profile table. Each device profile can include a device identifier, a target bandwidth and a priority number. The device identifier can identify the wireless device. In one embodiment, a MAC (media access control) address associated with the wireless device is used as the device identifier. In another embodiment, a serial number is used as the device identifier. The target bandwidth of the wireless device can specify a desired minimum bandwidth. The target bandwidth can be a bandwidth that provides smooth operation and acceptable performance for the wireless device. For example, a target bandwidth of 8 Mb/s can be selected for the tablet computer 124, particularly when the tablet computer 124 will be used for video streaming. The priority number can assign a priority to each wireless device. The priority number can indicate which particular wireless devices have priority over other wireless devices with respect to maintaining the target bandwidth of the particular wireless devices. In one embodiment, the device profile table is stored within the self-locating AP 102. In another embodiment, the device profile list is stored remotely from the self-locating AP 102 and retrieved when needed by the self-locating AP 102. The device profiles can be created by a user or owner of the self-locating AP 102 and entered through an appropriate user interface. For example, device profiles can be entered through a user interface shown in a digital display of the self-locating AP 102. In another example, device profiles can be entered through another application such as a web-based application running on a separate host computer and downloaded to the self-locating AP 102. In another embodiment, the device profiles are determined by a software application running on the self-locating AP 102. For example, the software application can monitor wireless traffic between a wireless devices and the self-locating AP 102. The software application can determine a device profile based, at least in part, on a data bandwidth of wireless traffic between the wireless device and the self-locating AP 102.

At stage B, the self-locating AP 102, located in a first location, determines the wireless link bandwidth of the wireless devices coupled to the self-locating AP 102. As shown, smart phone 120 and tablet computer 124 are wirelessly coupled to self-locating AP 102. Smart phone 120 has a wireless link bandwidth of BW1 and tablet computer 124 has a wireless link bandwidth BW2. The self-locating AP 102 can determine the wireless link bandwidths of the wireless devices (smart phone 120 and tablet computer 124) through RSSI values, measuring data throughput or determining MCS settings. For example, the self-locating AP 102 can correlate RSSI values associated with a wireless device to determine, at least in part, the wireless link bandwidth. The RSSI value can be correlated to a wireless link bandwidth through a look up table, transfer function or similar procedure. In another example, the self-locating AP 102 can measure the data throughput used by a particular wireless devices to determine the wireless link bandwidth for the particular wireless device. In yet another example, the self-locating AP 102 can determine the MCS is used by a particular wireless device to determine the wireless link bandwidth for the particular wireless device. The example wireless link bandwidth determination procedures described above can be used alone or in combination with each other.

At stage C, the self-locating AP 102 can compare the wireless link bandwidths to the target bandwidths included in the device profile table. In one embodiment, the self-locating AP 102 can identify the wireless link through the device identifier such as a MAC address or serial number of the wireless device. If the wireless link bandwidth for a particular device is less than the target bandwidth for that particular device, then in stage D, the self-locating AP 102 can determine a second operating location. For example, the self-locating AP 102 can determine the current (first) location of the self-locating AP 102 and the locations of the wireless devices currently connected to self-locating AP 102. The self-locating AP 102 can determine a new (second) location of the self-locating AP 102 that increases the wireless link bandwidth for the wireless device having a wireless link bandwidth less than the target bandwidth for that wireless device. In one embodiment, the self-locating AP 102 can determine the location of the wireless devices using Wi-Fi positioning information included in communication signals compliant to the IEEE 802.11v standard. In other embodiments, the self-locating AP 102 can use round trip time signal information, location information such as navigation information or any other technically feasible location determining method. The second operating location of the self-locating AP 102 can be based, at least in part, on reducing the distance between the self-locating AP 102 and the wireless device having the wireless link bandwidth that is less than the target bandwidth. In one embodiment, the second operating location of the self-locating AP 102 can be limited to locations on an operating pathway that was previously defined by the user. In another embodiment, the operating pathways can be dynamically determined through a self-initiation process. For example, when the self-locating AP 102 is initially power-up, the self-locating AP 102 can traverse through the service area 114 and determine operating pathways. If the service area 114 is a house, then the self-locating AP 102 can determine walls that can form boundaries and operating pathways.

At stage E, the self-locating AP 102 can autonomously move itself to the second operating location. For example, the self-locating AP 102 can be fan-powered and can hover over to the second operating location. In another example, the self-locating AP 102 can be supported by a helium filed balloon and can include directional fans to move the self-locating AP 102 to the second operating location. In still another example, the self-locating AP 102 can include wheels and motors that can allow the self-locating AP 102 to roll or "drive" over to the second operating location. The self-locating AP 102 can use any technically feasible components operable to move the self-locating AP 102 to the second operating location.

To illustrate the process described above, consider the self-locating AP 102 located in the first operating location 202 a distance A1 from smart phone 120 and a distance B1 from tablet computer 124. A wireless link between smart phone 120 and self-locating AP 102 has a wireless link bandwidth of BW1 and a wireless link between tablet computer 124 and self-locating AP 102 has a wireless link bandwidth of BW2. If the bandwidth BW2 between the self-locating AP 102 and the tablet computer 124 is less than the target bandwidth for the tablet computer 124 (as described in the associated device profile), then the self-locating AP 102 can determine and move itself to a second operating location 204 that decreases the distance between tablet computer 124 and self-locating AP 102 and thereby increases the wireless link bandwidth between the tablet computer 124 and the self-locating AP 102. For example, the second operating location 204 can provide a distance B2 between tablet computer 124 and self-locating AP 102, where B2 is less than B1 and therefore the wireless link bandwidth BW3 between the tablet computer 124 and the self-locating AP 102 increases commensurately. As shown, the distance between the self-locating AP 102 and smart phone 120 can increase from A1 to A2 when the self-locating AP 102 moves to the second operating location 204. If the additional distance between the smart phone 120 and the self-locating AP 102 is not sufficient to reduce the wireless link bandwidth BW1 to less than the target bandwidth for the smart phone 120, than the self-locating AP 102 can move to the second operating location 204 and satisfy the target bandwidths for both smart phone 120 and tablet computer 124.

There may be some situations where there is no operating location for the self-locating AP 102 that can satisfy all the target bandwidths for all the wireless devices currently connected to self-locating AP 102. In these situations, the priority number included in the device profile can prioritize bandwidth service for the wireless devices. For example, if tablet computer 124 has a higher priority number than smart phone 120, then the self-locating AP 102 may choose a second operating location 204 to improve the wireless link bandwidth between tablet computer 124 and the self-locating AP 102 and degrade the wireless link bandwidth between smart phone 120 and self-locating AP 102.

The self-locating AP 102 can have a default location that is central to the service area 114. The self-locating AP 102 can position itself in the default location when no wireless devices are active. The self-locating AP 102 can also position itself in the default location when no location can be determined that satisfies the target bandwidths for the wireless devices. For example, if two wireless devices are placed at one extreme of the service area 114 and a third device is placed at different extreme and no operating location can be determined that can satisfy all the target bandwidths, then the self-locating AP 102 can position itself in the default location. Furthermore, if no wireless devices are active, the self-locating AP 102 can conserve battery life by powering down fans, motors etc. that are used to move the self-locating AP 102.

The self-locating AP 102 is a mobile device and uses a stored energy device to provide power for the wireless interfaces and the fans or motors used to move the self-locating AP 102. For example, the stored energy devices can be rechargeable or replaceable batteries, super capacitors or the like. The self-locating AP 102 can replenish the stored energy devices by capturing solar energy using solar cells and recharging the batteries. In another example, the self-locating AP 102 can replenish the stored energy devices through non-contact inductive chargers that can be positioned at various places within the service area 114. In another example, the self-locating AP 102 can position itself on a battery charging dock when the self-locating AP 102 detects that the stored energy devices are depleted or when the self-locating AP 102 determines that there are no active wireless devices. In one embodiment, the battery charging dock can be located at the default location.

In one embodiment, the comparison described in Stage C can include thresholds to prevent unnecessary movement of the self-locating AP 102 and thereby conserve battery life. For example, when the self-locating AP 102 compares wireless link bandwidths to target bandwidths, progression to Stage D is prevented if present wireless link bandwidths do not differ by more than a threshold amount from previous wireless link bandwidths. In another embodiment, the movement described in Stage E is not provided unless the second location is more than a threshold amount away from the first location.

Figure 3:
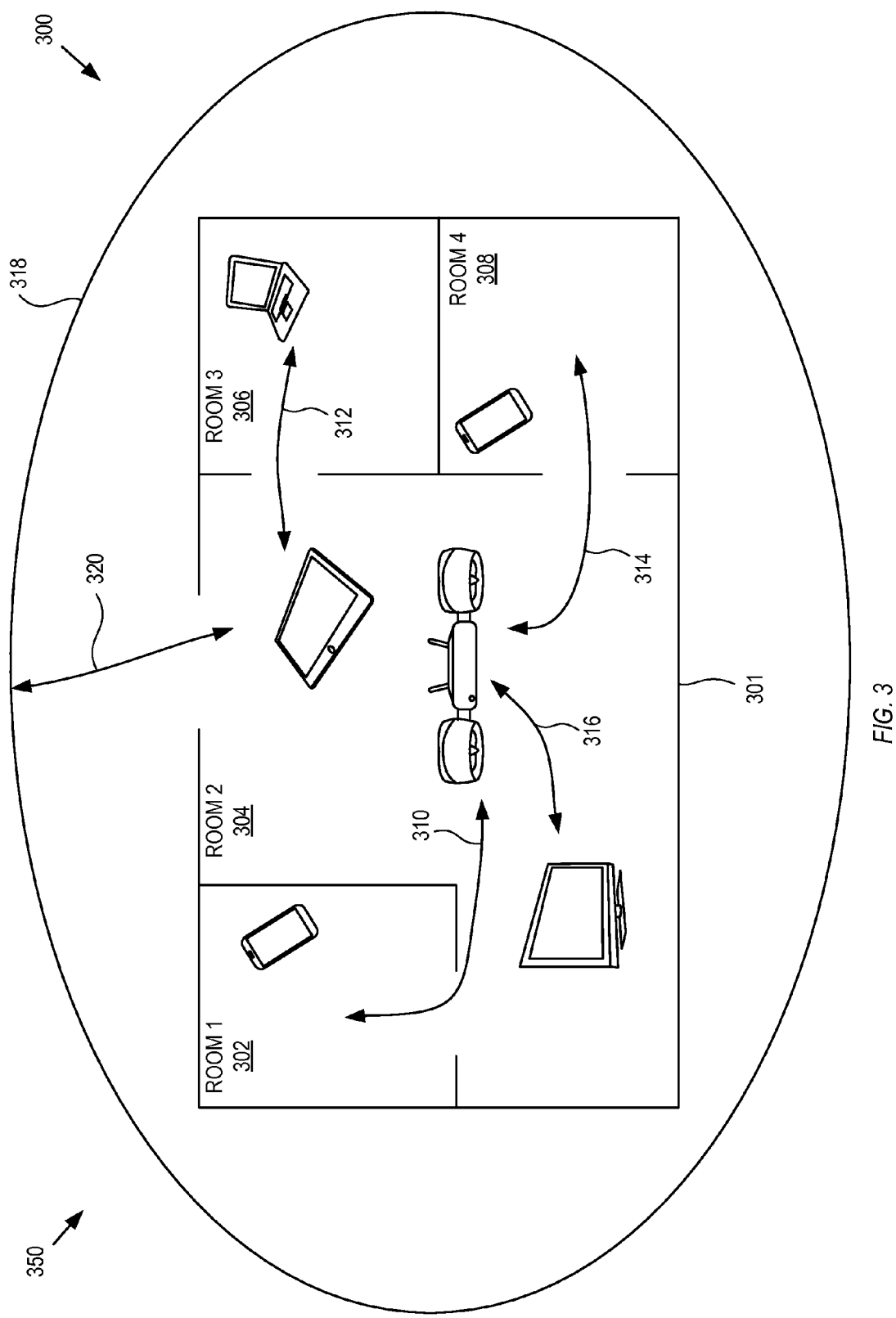
FIG. 3 is a diagram showing an example service area served by a self-locating access point, according to some embodiments.

FIG. 3 is a diagram 300 showing an example service area 350 served by a self-locating AP 102, according to some embodiments. The service area 350 includes a residential unit 301 including four rooms: room 1 302, room 2 304, room 3 306 and room 4 308. Operating pathways can be defined for the self-locating AP 102 that can provide access to areas within the service area 350. For example, operating pathway 310 provides access to room 1 302, operating pathway 312 provides access to room 3 306 and operating pathway 314 provides access to room 4 308. Room 2 304 can be served by these operating pathways as well as operating pathway 316.

The self-locating AP 102 can service rooms within residential unit 301 using operating pathways 310, 312, 314 and 316 either alone or in combination. Operating pathways need not be limited to indoors. An operating pathway can take the form of a loop or orbit around the outside of residential unit 301, such as operating pathway 318. Operating pathway 320 can link operating pathways inside residential unit 301 to operating pathway 318.

Figure 4:
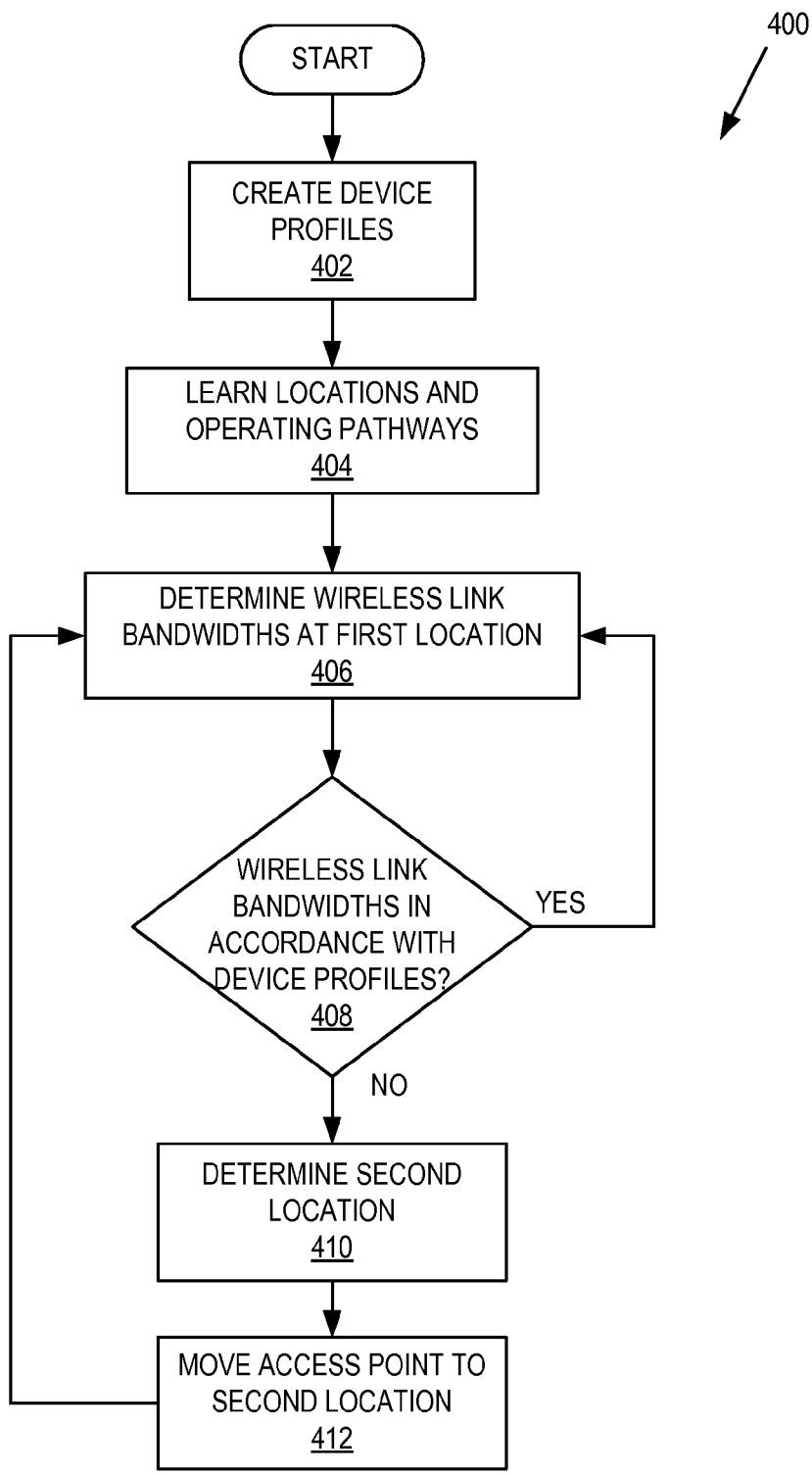
FIG. 4 is a flowchart illustrating example operations of a self-locating access point, according to one embodiment.

FIG. 4 is a flowchart 400 illustrating example operations of a self-locating access point, according to one embodiment. Beginning in block 402, device profiles for the wireless devices that couple with self-locating AP 102 are created. In one embodiment, the device profiles are placed together in a device profile table and are stored in the self-locating AP 102. In another embodiment, the device profiles are stored remotely and can be retrieved by self-locating AP 102. The device profiles can include a device identifier, a target bandwidth for network traffic and a priority number. The device identifier can uniquely identify each wireless device. In one implementation, MAC addresses or serial numbers can be used as device identifiers. The target bandwidth can specify a desired minimum bandwidth for the wireless device. The priority number can indicate which particular wireless devices have priority over other wireless devices with respect to maintaining the target bandwidth of the particular wireless devices. In one embodiment, the user provides the device profiles though a user interface (not shown). In another embodiment, the device profiles are determined by a software application running on the self-locating AP 102.

Proceeding to block 404, the self-locating AP 102 can receive operating pathways for the service area 114. In one embodiment, the self-locating AP 102 can receive the operating pathways by learning the operating pathways as the self-locating AP 102 is moved through possible operating pathways by the user. The self-locating AP 102 can be restricted (constrained) to operating in locations included in the determined operating pathways.

Proceeding to block 406, the self-locating AP 102 can determine the wireless link bandwidths of the wireless devices while the self-locating AP 102 is at a first operating location. As described above, the wireless link bandwidths can be determined by observing RSSI values, by observing data throughput, by observing MCS settings or any other technically feasible means.

Proceeding to block 408, the wireless link bandwidth is compared to the target bandwidth that is included in the device profile (created in block 402). For example, a wireless link bandwidth can be associated with a wireless device (identified through the device identifier such as the MAC address) and the wireless link bandwidth can be compared to the target bandwidth for that wireless device. If the wireless link bandwidth for the wireless device coupled to the self-locating AP 102 is greater than the target bandwidth for that particular device, then the flow can return to block 406. On the other hand, if the wireless link bandwidth is less than the target bandwidth, then in block 410 the self-locating AP 102 can determine a second operating location. In one embodiment, the second operating location can be limited to operating pathways determined in block 404. In another embodiment, the second operating location can be limited to an area bound by location coordinates. The second operating location can allow the wireless device to have an increased wireless link bandwidth. Proceeding to block 412, the self-locating AP 102 moves to the second operating location. The self-locating AP 102 is operable to move itself autonomously to the second operating location. The self-locating AP 102 can move itself without any external commands or instructions. The flow returns to block 406.

In one embodiment, determining the second operating location in block 410 may improve the wireless link bandwidth between the wireless device and the self-locating AP 102, but may not meet the target bandwidth for the wireless device. For example, the wireless link bandwidth between the wireless device and the self-locating AP 102 at the second operating location can be greater than the wireless link bandwidth when the self-locating AP 102 is at the first operating location, but not greater than the target bandwidth for the wireless device. Thus, the second operating location can, in some circumstances, improve the wireless link bandwidth, yet may not meet the target bandwidth for the wireless device. For example, a second operating location may not exist that can allow the self-locating AP 102 to meet or exceed the target bandwidth, however there may be a second operating location that can improve the wireless link bandwidth to the wireless device. In another embodiment, in block 410 the self-locating AP 102 can determine more than one second operating location that may satisfy the target bandwidth for the wireless device. The self-locating AP 102 can select one second operating location from the determined second operating locations. For example, the self-locating AP 102 can select a second operating location closest to the current operating location.

In another embodiment, the self-locating AP 102 can conditionally determine the second operating location. Moving the self-locating AP 102 can require energy resources that can deplete energy stores within self-locating AP 102. To help conserve energy, in block 412 the self-locating AP 102 can move to the second operating location when the wireless link bandwidth provided at the second operating location is greater than or equal to the wireless link bandwidth provided at the first operating location plus a bandwidth threshold. Adding the bandwidth threshold to the wireless link bandwidth can prevent unnecessary movement of the self-locating AP 102. For example, self-locating AP 102 may be moved when a substantial improvement (based, at least in part, on the bandwidth threshold) in wireless link bandwidth is realized by the second operating location. If the second operating location cannot provide a substantial improvement, then in block 412, the self-locating AP 102 may remain in the first operating location.

In yet another embodiment, the bandwidth threshold and the target bandwidth can be considered in parallel in block 410/block 412. For example, the second operating location can provide a wireless link bandwidth between the wireless device and self-locating AP 102 that is greater than the wireless link bandwidth associated with the first operating location plus a bandwidth threshold. The second operating location can also provide a wireless link bandwidth that is less than the target bandwidth. In this manner, the second operating location improves wireless link bandwidth by a bandwidth threshold amount, but is less than the target bandwidth for the wireless device.

It should be understood that FIGS. 1-4 and the operations described herein are examples meant to aid in understanding embodiments and should not limit embodiments or limit scope of the claims. Embodiments may perform additional operations, fewer operations, operations in a different order, operations in parallel, and some operations differently. For example, the programming or learning of the operating pathways described in block 404 can be optional. Instead of operational pathways, the self-locating AP 102 can have a limited area of operation bound by physical constraints such as walls or fences or bound by limits determined by location coordinates, such as latitude and longitude. In one embodiment, the comparison described in block 408 can also be executed periodically. For example, the self-locating AP 102 can compare the wireless link bandwidths and the target bandwidths once a minute or once an hour.

Figure 5:
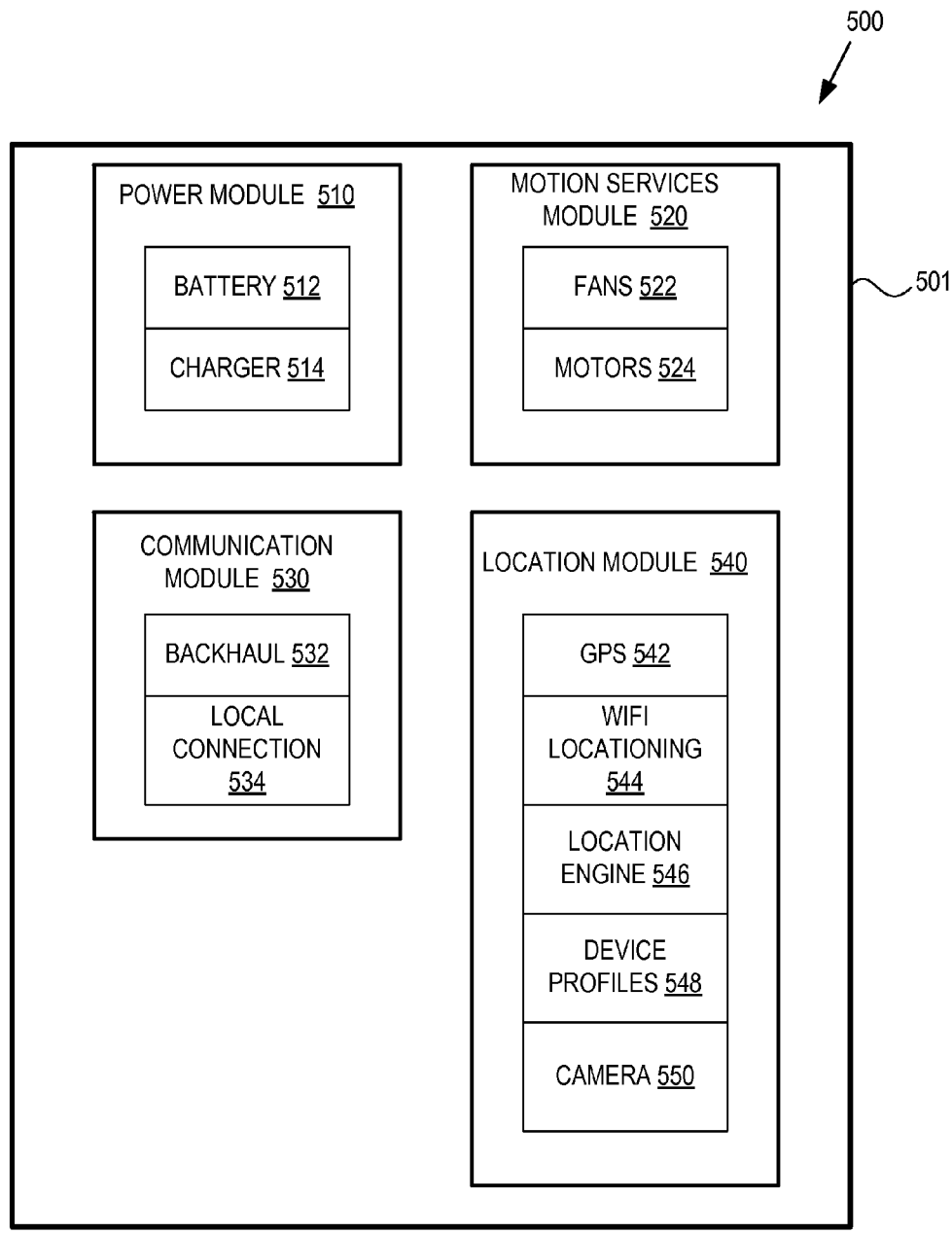
FIG. 5 shows an example block diagram of a self-locating access point, according to some embodiments.

FIG. 5 shows an example block diagram 500 of a self-locating access point 501, according to some embodiments. The self-locating AP 501 can include a power module 510, a motion services module 520, a communication module 530 and a location module 540. The power module 510 can include energy storage elements to provide power for the self-locating AP 501 such as a battery 512. The battery 512 can be a rechargeable battery, reducing or eliminating the need to replace the battery 512. Power module 510 can include a charger 514 to replenish the charge of the battery 512. For example, the charger 514 can include solar cells to convert solar energy to electrical energy and charge the battery 512. The charger 514 can be a non-contact inductive charger that can receive magnetic or electrical fields and convert those fields into electrical energy and charge the battery 512. The charger 514 can cooperatively function with a charging dock (not shown). When the self-locating AP 501 determines that the battery 512 is low on charge, then the self-locating AP 501 can locate and position itself on the charging dock. The charging dock can deliver power to the charger 514 and recharge the battery 512.

The motion services module 520 can include elements and mechanisms that propel the self-locating AP 501 to operating locations in the service area 114. The exact components of the motion services module 520 can vary. In one embodiment, the motion services module 520 can include fans 522 that can enable the self-locating AP 501 to hover and move in the service area 114. In another embodiment, motion services module 520 can include motors 524 and drive wheels (not shown) to move the self-locating AP 501 in the service area. In yet another embodiment, motion services module 520 can work in conjunction with a helium filled balloon (not shown) to move and position the self-locating AP 501.

The communication module 530 can include two wireless interfaces. A backhaul module 532 can provide a two-way wireless communication link to network or broadband resources, such as a broadband network. The backhaul module 532 can include cellular radios, such as those that can conform to 3GPP 3G/4G LTE, CDMA2000 other similar standards. In another embodiment, the backhaul module 532 can use any technically feasible wireless technology such as Wi-Fi technology, particularly if the Wi-Fi technology does not overlap any other radio technology used by the self-locating AP 501. The communication module 530 also includes a local connection module 534. The local connection module 534 provides local wireless connection between the self-locating AP 501 and wireless devices in the service area 114. The local connection module 534 can use interfaces that conform to ZigBee protocols, IEEE 802.11 standards or any other technically feasible wireless interfaces.

Location module 540 can include components related to locating the self-locating AP 501 and wireless devices in the service area 114 such as GPS module 542, Wi-Fi locationing module 544, location engine 546 and the device profiles module 548. The GPS module 542 receives GPS satellite signals and determines the location of the self-locating AP 501. Wi-Fi locationing module 544 can determine the locations of the wireless devices in the service area through any technically feasible, Wi-Fi based method. For example, round trip time of wireless messages or time of flight calculations of wireless messages can determine, at least in part, the locations of the wireless devices. Another approach can use location information included in IEEE 802.11v compliant signals. Still another approach can use GPS data from the wireless devices, transmitted through Wi-Fi signals to the self-locating AP 501. In some implementations, location module 540 can include sensors such as proximity sensors that can enable the self-locating AP 501 to move within the service area 114 without bumping into walls or other obstructions such as people or pets. For example, ultrasonic, infrared or camera 550 based sensors can be used to detect walls or obstructions.

Device profiles module 548 can include information of the wireless devices in the service area 114, such as the device identifier, the target device bandwidth and the priority number. In one embodiment the device profiles are retrieved from a separate storage entity (e.g., remote server) and stored locally in device profiles module 548.

Location engine 546 can calculate the second operating location of the self-locating AP 501 based, at least in part, on the wireless link bandwidths, the location of the wireless devices, the location of the self-locating AP 501 and the target bandwidths. The location engine 546 can determine the second operating location, located on the operating pathways, that provides the target bandwidths specified in the device profiles module 548 by, at least in part, reducing the distances between the wireless devices and the self-locating AP 501. The location engine 546 can use priority numbers to indicate which wireless devices have priority over other wireless devices when determining the second operating location. The location engine 546 can use the priority numbers to indicate which particular wireless devices have priority over other wireless devices with respect to maintaining the target bandwidth of the particular wireless devices.

The camera 550 can also be used for facial recognition to insure that a wireless device is in operation. For example, if the network enabled TV 122 is powered on and functioning, the self-locating AP 501 can provide data in accordance with the device profile of the network enabled TV 122. However, if there is no one in the room with the network enabled TV 122, then the provided bandwidth is wasted. The self-locating AP 501 can use the camera 550 to determine if there are users in the room through facial recognition. If there are no users in the room, the self-locating AP 501 can diminish the device bandwidth provided to the network enabled TV 122.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
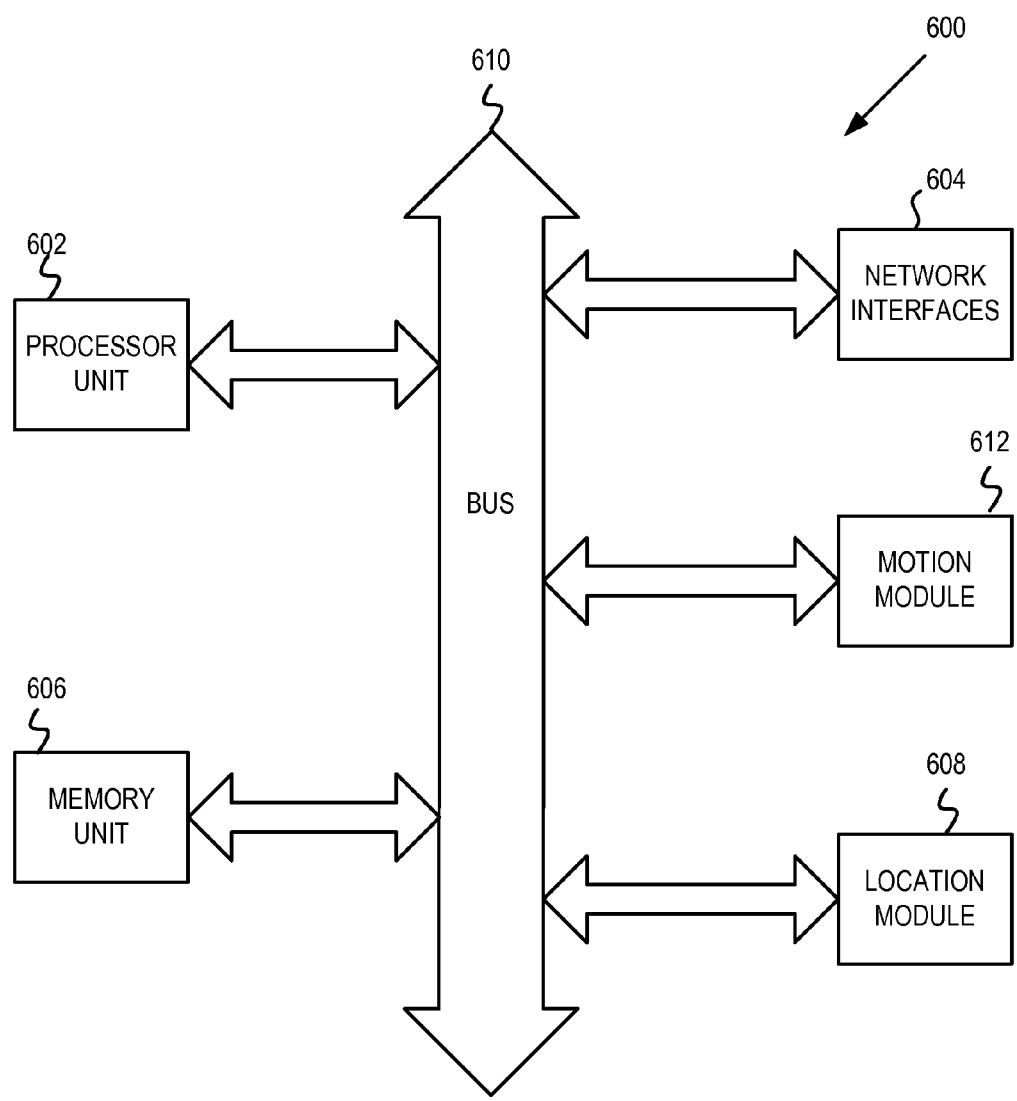
FIG. 6 is a block diagram of one embodiment of an electronic device implementing one or more aspects of a self-locating access point.

FIG. 6 is a block diagram of one embodiment of an electronic device 600 implementing one or more aspects of a self-locating AP 102. In some implementations, the electronic device 600 may be one of a laptop computer, a tablet computer 124, a mobile phone, a powerline communication device, a smart appliance (PDA), access point or other electronic systems. The electronic device 600 can include processor unit 602 (possibly including multiple processors, multiple cores, multiple nodes, and/or implementing multi-threading, etc.). The electronic device 600 can also include memory unit 606. Memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. Electronic device 600 can also include bus 610 (e.g., PCI, ISA, PCI-Express, HyperTransport®, InfiniBand®, NuBus, AHB, AXI, etc.), and network interfaces 604 that include at least one of a wireless network interface (e.g., a WLAN interface, a Bluetooth interface, a WiMAX interface, a ZigBee interface, a Wireless USB interface, etc.) and a wired network interface (e.g., an Ethernet interface, a powerline communication interface, etc.). In some implementations, electronic device 600 may support multiple network interfaces—each of which is configured to couple the electronic device 600 to a different communication network.

Motion module 612 can include components that propel, move and position the electronic device 600. For example, motion module 612 can include at least one of blowers, fans, servos and drive motors to move the electronic device 600. Other portions of self-locating AP 102 can be distributed within processor unit 602, memory unit 606 and bus 610.

The memory unit 606 can embody functionality to implement embodiments described in FIGS. 1-5 above. For example, memory unit 606 can include one or more functionalities that facilitate determining wireless link bandwidths, determining wireless device locations and determining new operating locations. Memory unit 606 can also be used to store device profiles and device profile tables. Any one of these functionalities may be partially (or entirely) implemented in hardware and/or on the processor unit 602. For example, the functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). Processor unit 602, memory unit 606, network interfaces 604 and location module 608 are coupled to bus 610. Although illustrated as being coupled to the bus 610, memory unit 606 may be coupled to processor unit 602.

While the embodiments are described with reference to various implementations and exploitations, it will be understood that these embodiments are illustrative and that the scope of the inventive subject matter is not limited to them. In general, techniques for determining operating locations of an access point in relation to wireless devices and target link bandwidths as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method performed by a self-locating access point, the method comprising:
   determining a first target bandwidth associated with a first wireless device communicatively coupled with the self-locating access point, wherein the first target bandwidth is determined by a device profile corresponding to the first wireless device;
   determining, by the self-locating access point, a first wireless link bandwidth between the self-locating access point and the first wireless device, the first wireless link bandwidth associated with a first operating location of the self-locating access point;
   determining a second operating location of the self-locating access point in response to a determination that the first wireless link bandwidth is less than the first target bandwidth; and
   causing the self-locating access point to move to the second operating location via a component of the self-locating access point.

2. The method of claim 1, wherein causing the self-locating access point to move to the second operating location comprises operating the component of the self-locating access point to reposition the self-locating access point to the second operating location.

3. The method of claim 1, wherein causing the self-locating access point to move to the second operating location comprises autonomously repositioning the self-locating access point from the first operating location to the second operating location.

4. The method of claim 1, wherein determining the second operating location comprises determining a second wireless link bandwidth, greater than the first wireless link bandwidth, between the self-locating access point and the first wireless device at the second operating location.

5. The method of claim 1, wherein determining the second operating location comprises determining a second wireless link bandwidth, greater than the first target bandwidth, between the self-locating access point and the first wireless device at the second operating location.

6. The method of claim 1, wherein determining the second operating location comprises determining a second wireless link bandwidth, greater than a bandwidth threshold, and less than the first target bandwidth, between the self-locating access point and the first wireless device at the second operating location.

7. The method of claim 1, wherein the first operating location and the second operating location are constrained to an operating pathway.

8. The method of claim 7, wherein causing the self-locating access point to move to the second operating location constrains the self-locating access point to locations within a tolerance distance of the operating pathway.

9. The method of claim 8, further comprising:
   determining the operating pathway by capturing, using the self-locating access point, location information while the self-locating access point moves along a desired operating pathway.

10. The method of claim 9, wherein the location information comprises Global Positioning System location information.

11. The method of claim 1, wherein causing the self-locating access point to move to the second operating location comprises moving the self-locating access point by hovering to the second operating location.

12. The method of claim 1, wherein causing the self-locating access point to move to the second operating location comprises moving the self-locating access point by one of rolling and driving operations to the second operating location.

13. The method of claim 1, further comprising storing the device profile corresponding to the first wireless device in a memory of the self-locating access point.

14. The method of claim 1, wherein the device profile is created in response to user input.

15. The method of claim 1, wherein the device profile is created by monitoring a wireless connection between the first wireless device and the self-locating access point.

16. The method of claim 1, wherein determining the second operating location of the self-locating access point comprises selecting a location having a reduced distance to the first wireless device with respect to the first operating location.

17. The method of claim 1, wherein determining the second operating location of the self-locating access point further comprises determining a second wireless link bandwidth between the self-locating access point and a second wireless device communicatively coupled to the self-locating access point.

18. The method of claim 17, further comprises determining when the second wireless link bandwidth for the second wireless device is less than a second target bandwidth of the second wireless device.

19. The method of claim 18, wherein determining the second operating location comprises determining a third wireless link bandwidth, greater than the second target bandwidth, between the self-locating access point and the second wireless device.

20. The method of claim 1, further comprising:
   determining a first priority number for the first wireless device and a second priority number for a second wireless device communicatively coupled to the self-locating access point; and
   selecting the second operating location that increases a wireless link bandwidth to the first wireless device in response to a determination that the first priority number is higher than the second priority number.

21. The method of claim 20, wherein the first priority number for the first wireless device is determined by the device profile and the second priority number for the second wireless device is determined by a second device profile corresponding to the second wireless device.

22. A self-locating access point comprising:
a processor; and
a memory having instructions stored therein, which when executed by the processor, cause the self-locating access point to:
   determine a first target bandwidth associated with a first wireless device communicatively coupled with the self-locating access point, wherein the first target bandwidth is determined by a device profile corresponding to the first wireless device;
   determine, by the self-locating access point, a first wireless link bandwidth between the self-locating access point and the first wireless device, the first wireless link bandwidth associated with a first operating location of the self-locating access point
   determine a second operating location of the self-locating access point in response to a determination that the first wireless link bandwidth is less than the first target bandwidth; and
   cause the self-locating access point to move from the first operating location to the second operating location.

23. The self-locating access point of claim 22, further comprising a component configured to reposition the self-locating access point to the second operating location.

24. The self-locating access point of claim 22, wherein the instructions, when executed by the processor, cause the self-locating access point to determine autonomously the second operating location.

25. The self-locating access point of claim 22, wherein the instructions, when executed by the processor, cause the self-locating access point to determine the second operating location comprising a second wireless link bandwidth, greater than the first wireless link bandwidth, between the self-locating access point and the first wireless device.

26. The self-locating access point of claim 22, wherein the instructions, when executed by the processor, cause the self-locating access point to determine the second operating location comprising a second wireless link bandwidth, greater than the first target bandwidth, between the self-locating access point and the first wireless device.

27. The self-locating access point of claim 22, wherein the instructions, when executed by the processor, cause the self-locating access point to determine the second operating location comprising a second wireless link bandwidth, greater than a bandwidth threshold and less than the first target bandwidth, between the self-locating access point and the first wireless device.

28. The self-locating access point of claim 22, wherein the instructions, when executed by the processor, cause the self-locating access point to constrain the second operating location to an operating pathway.

29. The self-locating access point of claim 28, wherein the instructions, when executed by the processor, cause the self-locating access point to determine the operating pathway by capturing location information while the self-locating access point moves along a desired operating pathway.

30. The self-locating access point of claim 29, wherein the location information comprises Global Positioning System location information.

31. The self-locating access point of claim 22, wherein the instructions, when executed by the processor, cause the self-locating access point to hover the self-locating access point to the second operating location.

32. The self-locating access point of claim 22, wherein the instructions, when executed by the processor, cause the self-locating access point to store the device profile in a memory of the self-locating access point.

33. The self-locating access point of claim 22, wherein the instructions, when executed by the processor, cause the self-locating access point to determine the device profile in response to user input.

34. The self-locating access point of claim 22, wherein the instructions, when executed by the processor, cause the self-locating access point to determine the device profile by monitoring a wireless connection between the first wireless device and the self-locating access point.

35. The self-locating access point of claim 22, wherein the instructions, when executed by the processor, cause the self-locating access point to determine a second wireless link bandwidth between the self-locating access point and a second wireless device.

36. The self-locating access point of claim 35, wherein the instructions, when executed by the processor, cause the self-locating access point to determine the second operating location of the self-locating access point when the second wireless link bandwidth is less than a second target bandwidth.

37. The self-locating access point of claim 35, wherein the instructions, when executed by the processor, cause the self-locating access point to:
   determine a first priority number for the first wireless device and a second priority number for the second wireless device; and
   select the second operating location that increases a wireless link bandwidth to the first wireless device in response to a determination that the first priority number is higher than the second priority number.

38. The self-locating access point of claim 37, wherein the first priority number is determined, at least in part, by the device profile, and the second priority number is determined, at least in part, by a second device profile corresponding to the second wireless device.

39. A non-transitory machine-readable storage medium having instructions stored therein, which when executed by a processor of a self-locating access point cause the self-locating access point to:
   determine a first target bandwidth associated with a first wireless device communicatively coupled with the self-locating access point, wherein the first target bandwidth is determined by a device profile corresponding to the first wireless device;
   determine a first wireless link bandwidth between the self-locating access point and the first wireless device, the first wireless link bandwidth associated with a first operating location of the self-locating access point;
   determine a second operating location of the self-locating access point in response to a determination that the first wireless link bandwidth is less than the first target bandwidth; and
   cause the self-locating access point to move to the second operating location via a component of the self-locating access point.

40. The non-transitory machine-readable storage medium of claim 39, wherein the instructions that cause the self-locating access point to move to the second operating location comprises instructions, which when executed by the processor, cause the self-locating access point to operate the component of the self-locating access point to reposition the self-locating access point to the second operating location.

41. The non-transitory machine-readable storage medium of claim 39, wherein the instructions that cause the self-locating access point to move to the second operating location comprises instructions, which when executed by the processor, cause the self-locating access point to autonomously reposition the self-locating access point from the first operating location to the second operating location.

42. The non-transitory machine-readable storage medium of claim 39, wherein instructions that cause the self-locating access point to determine the second operating location comprises instructions, which when executed by the processor, cause the self-locating access point to determine a second wireless link bandwidth, greater than the first wireless link bandwidth, between the self-locating access point and the first wireless device at the second operating location.

43. The non-transitory machine-readable storage medium of claim 39, wherein instructions that cause the self-locating access point to determine the second operating location comprises instructions, which when executed by the processor, cause the self-locating access point to determine a second wireless link bandwidth, greater than the first target bandwidth, between the self-locating access point and the first wireless device at the second operating location.

44. The non-transitory machine-readable storage medium of claim 39, wherein instructions that cause the self-locating access point to determine the second operating location comprises instructions, which when executed by the processor, cause the self-locating access point to determine a second wireless link bandwidth, greater than a bandwidth threshold, and less than the first target bandwidth, between the self-locating access point and the first wireless device at the second operating location.

45. The non-transitory machine-readable storage medium of claim 39, wherein the first operating location and the second operating location are constrained to an operating pathway.

46. The non-transitory machine-readable storage medium of claim 45, wherein the instructions that cause the self-locating access point to move to the second operating location comprises instructions, which when executed by the processor, cause the self-locating access point to constrain the self-locating access point to locations within a tolerance distance of the operating pathway.

47. The non-transitory machine-readable storage medium of claim 46, further comprising instructions, which when executed by the processor, cause the self-locating access point to:
determine the operating pathway by capturing, using the self-locating access point, location information while the self-locating access point moves along a desired operating pathway.

48. The non-transitory machine-readable storage medium of claim 47, wherein the location information comprises Global Positioning System location information.

49. The non-transitory machine-readable storage medium of claim 39, wherein the instructions that cause the self-locating access point to move to the second operating location comprises instructions, which when executed by the processor, cause the self-locating access point to move the self-locating access point by hovering to the second operating location.

50. The non-transitory machine-readable storage medium of claim 39, further comprising instructions, which when executed by the processor, cause the self-locating access point to store the device profile corresponding to the first wireless device in a memory of in the self-locating access point.

51. The non-transitory machine-readable storage medium of claim 50, wherein the device profile is created by monitoring a wireless connection between the first wireless device and the self-locating access point wherein the first operating location and the second operating location are constrained to an operating pathway.

52. The non-transitory machine-readable storage medium of claim 39, wherein the instructions to determine the second operating location of the self-locating access point comprises instructions, which when executed by the processor, cause the self-locating access point to select a location having a reduced distance to the first wireless device with respect to the first operating location.

53. The non-transitory machine-readable storage medium of claim 39, wherein the instructions to determine the second operating location of the self-locating access point comprises instructions, which when executed by the processor, cause the self-locating access point to determine a second wireless link bandwidth between the self-locating access point and a second wireless device communicatively coupled to the self-locating access point.

54. The non-transitory machine-readable storage medium of claim 53, further comprising instructions, which when executed by the processor, cause the self-locating access point to determine when the second wireless link bandwidth for the second wireless device is less than a second target bandwidth of the second wireless device.

55. The non-transitory machine-readable storage medium of claim 54, wherein the instructions to determine the second operating location comprises instructions, which when executed by the processor, cause the self-locating access point to determine a third wireless link bandwidth, greater than the second target bandwidth, between the self-locating access point and the second wireless device.

56. The non-transitory machine-readable storage medium of claim 53, further comprising instructions, which when executed by the processor, cause the self-locating access point to:
determine a priority number of the first wireless device and the second wireless device; and
select the second operating location that increases a wireless link bandwidth to the first wireless device in response to a determination that the first wireless device has a higher priority number than the second wireless device.

* * * * *